United States Patent
Couture et al.

(10) Patent No.: US 8,581,254 B2
(45) Date of Patent: Nov. 12, 2013

(54) PHOTODETECTOR HAVING IMPROVED QUANTUM EFFICIENCY

(75) Inventors: Aaron Judy Couture, Niskayuna, NY (US); Steven Jude Duclos, Niskayuna, NY (US); Joseph John Shiang, Niskayuna, NY (US); Gautam Parthasarathy, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 30 days.

(21) Appl. No.: 13/250,568

(22) Filed: Sep. 30, 2011

(65) Prior Publication Data

US 2013/0082264 A1   Apr. 4, 2013

(51) Int. Cl.
*H01L 29/04* (2006.01)
*H01L 29/10* (2006.01)
*G01R 1/20* (2006.01)

(52) U.S. Cl.
USPC .............. 257/59; 257/57; 257/290; 257/293; 257/E31.091; 250/370.11

(58) Field of Classification Search
USPC ........................................ 257/59, 290–293
See application file for complete search history.

(56) References Cited

U.S. PATENT DOCUMENTS

| | | | |
|---|---|---|---|
| 6,114,703 A | 9/2000 | Levin et al. | |
| 7,663,117 B2 | 2/2010 | Wittmann | |
| 2002/0079455 A1* | 6/2002 | Wieczorek | 250/367 |
| 2010/0148072 A1 | 6/2010 | Furst et al. | |
| 2011/0198505 A1* | 8/2011 | Ishida et al. | 250/363.01 |
| 2011/0260377 A1* | 10/2011 | Jiang | 264/621 |
| 2012/0181436 A1* | 7/2012 | Mollov | 250/366 |

FOREIGN PATENT DOCUMENTS

WO   2010122433   10/2010

* cited by examiner

*Primary Examiner* — Ha Tran T Nguyen
*Assistant Examiner* — Thai T Vuong
(74) *Attorney, Agent, or Firm* — Mary Louise Stanford

(57) ABSTRACT

The present approach involves a radiation detector module with increased quantum efficiency and methods of fabricating the radiation detector module. The module includes a scintillator substrate and a photodetector fabricated on the scintillator substrate. The photodetector includes an anode, active organic elements, and a cathode. The module also includes a pixel element array disposed over the photodetector. During imaging, radiation attenuated by an object to be imaged may propagate through the pixel element array and through the layers of the photodetector to be absorbed by the scintillator which in response emits optical photons. The photodetector may absorb the photons and generate charge with improved quantum efficiency, as the photons may not be obscured by the cathode or other layers of the module. Further, the module may include reflective materials in the cathode and at the pixel element array to direct optical photons towards the active organic elements.

12 Claims, 3 Drawing Sheets

PHOTODETECTOR HAVING IMPROVED QUANTUM EFFICIENCY

BACKGROUND

In X-ray based imaging systems, an X-ray source typically emits radiation (i.e., X-rays) towards a subject or object, such as a patient or luggage to be imaged. Hereinafter, the terms "subject" and "object" may be interchangeably used to describe anything capable of being imaged. The X-ray beams, after being attenuated by the subject or object, typically impinge upon an array of radiation detector elements of a detector that generates readable signals in response to the impinging radiation. The intensity of radiation beams reaching the detector is typically dependent on the attenuation and absorption of X-rays through the scanned subject or object. In certain detectors, a scintillator converts the X-ray radiation to lower energy optical photons that strike the detector elements. Each of the detector elements then produces a separate electrical signal indicative of the amount of X-ray radiation at the particular location of the element. The electrical signals are collected, digitized and transmitted to a data processing system for analysis and further processing to reconstruct an image.

As the image is reconstructed based on the electrical signals transmitted which are generated based on the amount of optical photons emitted by the scintillator, the performance of the detector system is affected by the scintillator's conversion of radiation to optical photons. Specifically, the quantum efficiency of the detector, or the sensitivity of the detector to the photons emitted by the scintillator, affects the accuracy of the detector in generating electrical signals indicative of the detected optical photons.

Conventionally, scintillator-based detectors are fabricated directly onto an array of pixel elements (e.g., TFT array). For example, layers of the detector may be deposited (e.g., spin coated, spray coated, etc.) on the TFT array, and a metal cathode may be used to electrically connect the detector to the scintillator. However, in the resulting configuration the photodetector may have a decreased quantum efficiency (e.g., by approximately 20%), due to photon absorption by the cathode. Such decreases in quantum efficiency of the detector may result in inefficiencies in the radiation detector system and/or inaccuracies in the reconstructed image.

BRIEF DESCRIPTION

In one embodiment, a radiation detector module is provided. The radiation detector module includes a TFT array, a photodetector disposed beneath the TFT array, and a scintillator substrate disposed beneath the photodetector. The photodetector includes a cathode disposed beneath the TFT array, an active organic element disposed beneath the cathode, and an anode disposed beneath the active organic element. The scintillator substrate is configured to absorb radiation and the photodetector and configured to emit optical photons in response to the absorbed radiation. The photodetector is configured to absorb the optical photons emitted by the scintillator and generate charge in response to the absorbed optical photons.

Another embodiment involves a method of manufacturing a radiation detector. The method includes forming a scintillator substrate, depositing an anode over the scintillator substrate, forming an active organic element over the anode, forming a cathode over the active organic element, and physically bonding an array of pixel elements to the cathode.

In yet another embodiment, a radiation detector and imaging system is provided. The radiation detector and imaging system includes a detector module including a scintillator substrate configured to absorb radiation attenuated by an object to be imaged and to emit optical photons in response to the absorbed radiation. The radiation is impinged through a pixel element array and a photodetector to the scintillator. The photodetector is disposed over the scintillator substrate and is configured to absorb the optical photons emitted by the scintillator and generate charge in response to the absorbed optical photons. The pixel element array is physically bonded and electrically coupled to the photodetector and is configured to produce electric signals corresponding to the charge generated by the photodetector. The radiation detector and imaging system also includes control circuitry configured to process the electric signals produced by the pixel element array to reconstruct an image of the object to be imaged.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure involve a radiation detector and imaging system having an X-ray source which emits radiation towards a subject or object, or anything capable of being imaged. The X-ray beams, after being attenuated by the subject or object, impinge a photodetector which produces a signal indicative of the amount of X-ray radiation at the particular location of the element. The signals are collected, digitized and transmitted to a data processing system for analysis and further processing to produce an image.

Figure 1:
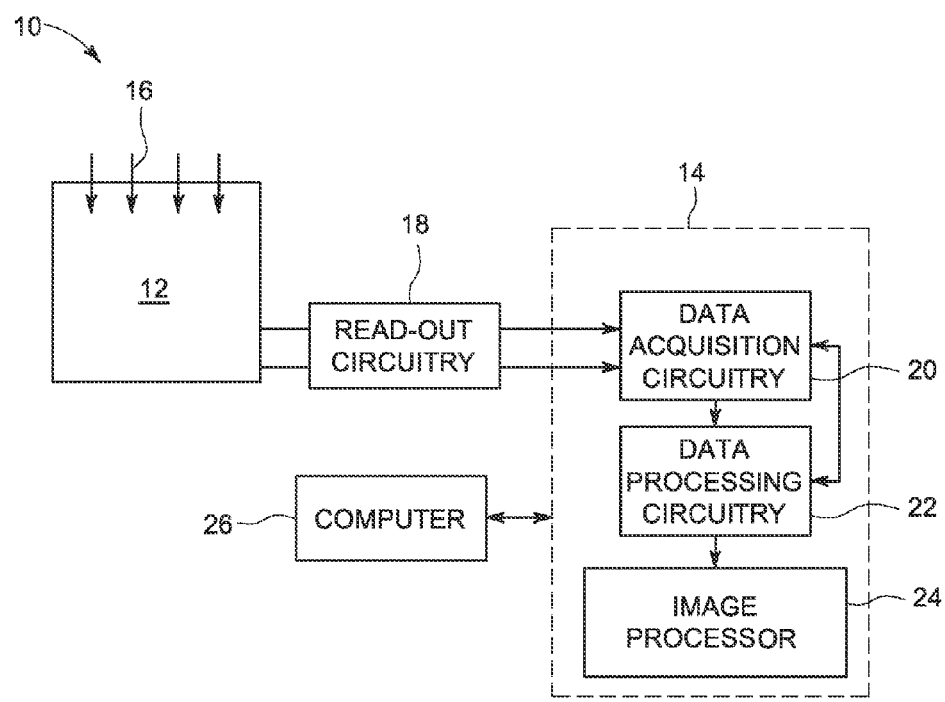
FIG. 1 depicts a photodetector system including a photodetector and its associated control circuitry for obtaining image data, in accordance with one embodiment of the present disclosure.

FIG. 1 depicts one embodiment of a radiation detector system 10 for use in an imaging system. While the system 10 is explained in the context of X-ray detection, in some embodiments, the system 10 may be adapted to detect other forms of electromagnetic signals (e.g., visible light). In the depicted embodiment, the radiation detector system 10 includes a photodetector module 12 and a control and processing circuitry 14. During imaging, incoming radiation 16 (i.e., X-rays) from an imaging source impinges the photodetector module 12 after being attenuated by an intervening subject or object undergoing imaging. As will be discussed in greater detail, the photodetector module 12 may include an element (e.g., scintillator) that absorbs the radiation 16 (for example, X-ray photons) and in response emits light of a characteristic wavelength, thereby releasing the absorbed energy. The released energy (i.e., the emitted light) may be detected by other elements (e.g., an organic photodiode) of the photodetector module 12 to generate electrical signals corresponding to the incident radiation 16.

The electrical signals generated by the photodetector module 12 are in turn acquired by readout circuitry 18 of the control and processing circuitry 14. The signals from the readout circuitry 18 are acquired by the data acquisition circuitry 20. In the depicted embodiment, the acquired signals are supplied to data processing circuitry 22 and/or to image processing circuitry 24. The data processing circuitry 22, when present, may perform various functions such as gain correction, edge detection, sharpening, contrast enhancement, and so forth to condition the data for subsequent processing or image reconstruction. The image processing circuitry or image processor 24 may in turn process the acquired signals to generate an image for a region of interest (ROI) traversed by the radiation 16. In the depicted embodiment, the control and processing circuitry 14 may be controlled by or implemented in a computer 26, which may include or be in communication with an operator workstation and/or an image display workstation. For example, an operator workstation maybe utilized by a system operator to provide control instructions to some or all of the components that aid in image generation. The operator workstation may also display the generated image in a remote location, such as on a separate image display workstation.

While in the illustrated embodiment, the control and processing circuitry 14 is depicted external to the photodetector module 12, in certain implementations, some or all of these circuitries may be provided as part of the photodetector assembly 12. Likewise, in certain embodiments some or all of the circuitry present in the control and processing circuitry 14 may be provided as part of a computer 26 such as may be embodied in an imaging workstation of operator workstation. Thus, in certain embodiments, aspects of the readout circuitry 18, data acquisition circuitry 20, data processing circuitry 22, image processing circuitry 24, as well as other circuitry of the control and processing circuitry 14, may be provided as part of the photodetector module 12 and/or as part of a connected computer 26.

Figure 2:
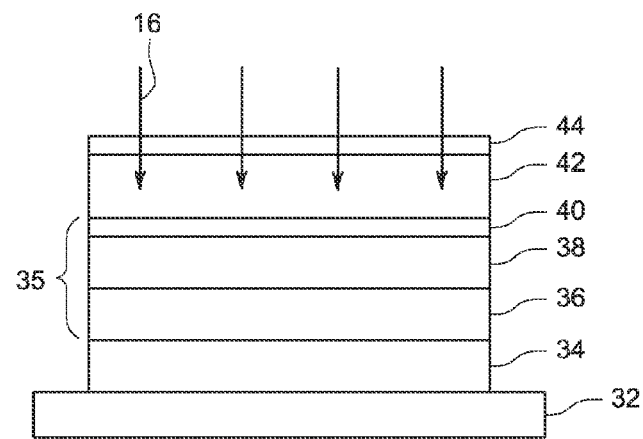
FIG. 2 depicts a conventional photodetector configuration.

An illustration of a conventional photodetector configuration is provided in FIG. 2. The photodetector is typically fabricated over a pixel element array 34, also referred to as a thin film transistor (TFT) array, disposed over a substrate 32. A photodetector 35 is typically fabricated directly over the imaging TFT array 34. The photodetector 35, also referred to as a photodiode or an organic photodiode (OPD), may include an anode 36, a cathode 40, and an organic film 38 between the anode 36 and cathode 40 which produces charged carriers in response to absorption of light. A scintillator 42 may be disposed over the cathode 40 of the photodetector 35, and a top cover 44 may cover the scintillator 42.

During an imaging process using the photodetector illustrated in FIG. 2, radiation 16 may impinge the photodetector and pass through the top cover 44 to be absorbed by the scintillator 42. The scintillator 42 may generate photons, such as optical photons, in response to the absorption of radiation 16. The photons generated by the scintillator may pass through the cathode 40 to be absorbed by the organic film 38 of the photodetector 35 which produces charged carriers in response to the absorbed optical wavelength photons. The charge produced by the photodetector 35 is stored by the TFT array 34 and transferred (e.g., via readout circuitry 18 to the control and processing circuitry 14) for further processing and image reconstruction.

In typical photodetectors, such as that illustrated in FIG. 2, the absorption of photons generated by the scintillator 42 may be obstructed by the cathode 40 of the photodetector 35. As the cathode 40 is conventionally metallic and opaque, a portion of the photons generated by the scintillator 42 may be absorbed or blocked by the cathode 40 and may never reach the active organic layer 38 of the photodetector 35. This may decrease the quantum efficiency of the photodetector 35 (e.g., by approximately 20%), as not all of the photons which impinge the photodetector 35 may produce an electron-hole pair between the cathode 40 and anode 36. Such decreases in quantum efficiency of the photodetector may result in inefficiencies in the radiation detector system and/or inaccuracies in the reconstructed image. Furthermore, because the photodetector 35 is deposited over the TFT array 34 in conventional photodetector fabrication techniques, the scintillator 42 must be optically bonded to the photodetector and TFT array assembly. In such configurations, photons may also be lost due to bonding defects when transiting between the scintillator 42 to the photodetector 35.

One or more embodiments of the present approach involve a photodetector 35 fabricated over a scintillator 42 and methods of fabricating such a photodetector module 12. In accordance with the present approach, light generated by the scintillator 42 in response to radiation 16 may be emitted and/or reflected towards the active organic layers 38 without first being obstructed by the cathode 40 of the photodetector 35. Furthermore, by fabricating the photodetector directly over the scintillator 42 (or over a planarizing layer disposed over the scintillator 42), bonding steps may not be necessary, and may further reduce inefficiencies in the transfer of photons from the scintillator 42 to the photodetector 35 and improving the quantum efficiency of the photodetector module 12.

Figure 3:
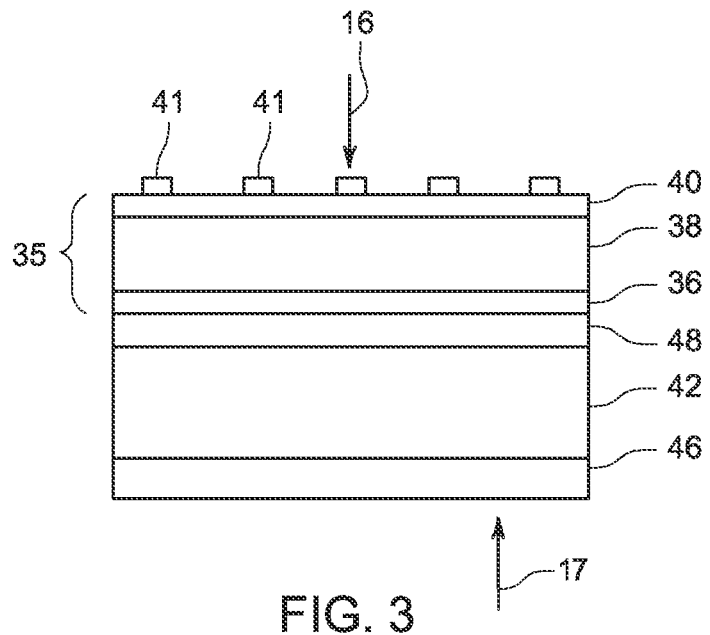
FIG. 3 depicts a first step in fabricating a photodetector disposed over a scintillator, in accordance with one embodiment of the present disclosure.
Figure 4:
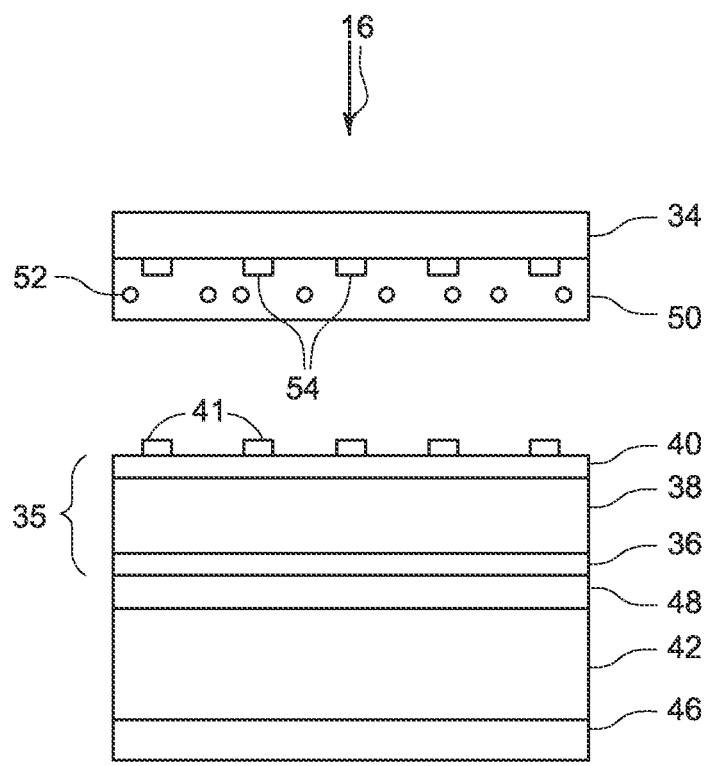
FIG. 4 depicts a second step in fabricating the photodetector disposed over the scintillator, in accordance with one embodiment of the present disclosure.
Figure 5:
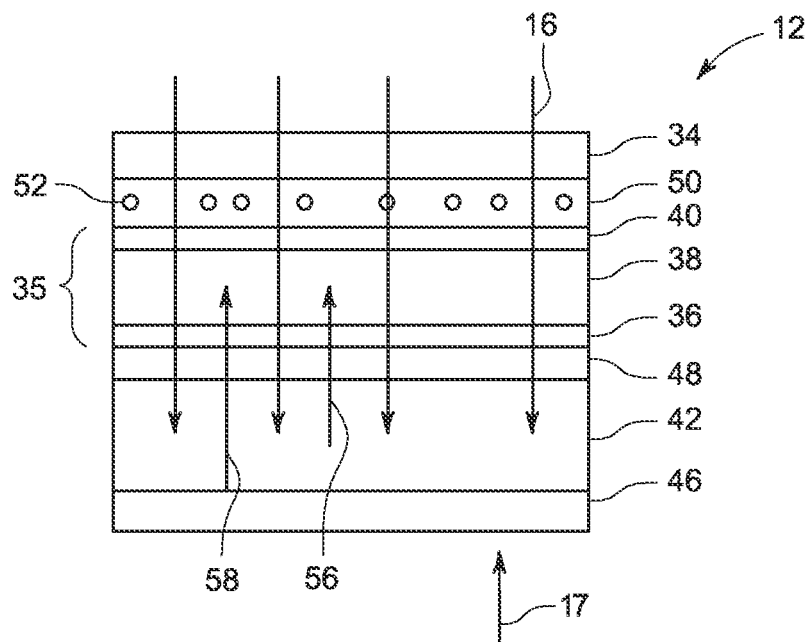
FIG. 5 depicts side view of the photodetector disposed over the scintillator in accordance with the fabrication techniques illustrated in FIGS. 3 and 4, in accordance with one embodiment of the present disclosure.

FIGS. 3 and 4 are side view illustrations of intermediate forms during the fabrication of a photodetector module 12, and FIG. 5 is a side view of a complete photodetector module 12 in accordance with one embodiment of the present approach. Beginning first with FIG. 3, a photodetector module 12 includes a photodetector 35 fabricated over the scintillator 42. The scintillator 42 may be formed from materials which absorb radiation 16 or 17 (impinging the photodetector module 12 in either direction perpendicular to the plane of the photodetector module 12) and in response emit light of a characteristic wavelength, thereby releasing the absorbed energy. Various types of scintillation materials may be employed which convert radiation into a form of energy detectable by the photodetector 35, such as optical or other lower energy photons. In some embodiments, the scintaillation materials may be deposited on glass or a polymer film, such as poly carbonate or PET (polyethylene terephthalate). Moreover, because the scintillator 42 is not deposited over the organic materials of the photodetector 35 (as is typical in conventional fabrication methods), various scintillator materials which may otherwise damage the photodetector 35 may be used in certain embodiments. Such scintillator materials may have higher efficiency than conventional scintillator materials and may include, for example, sinter or sputter deposited ceramic and/or glass, as well as particle-in-binder scintillators.

A reflector 46 may be formed over one side of the scintillator 42. In some embodiments, the reflector 46 may include reflective materials suitable for reflecting photons generated by the scintillator 42 and may also be suitable for providing barrier protection for the scintillator 42 and/or for other layers of the photodetector module 12 from adverse environmental reactants (e.g., water vapor, oxygen, etc.). In some embodiments, the reflector 46 may be a substantially uniform layer having low absorption and may have a thickness in the range of approximately 0.1 mm to 1 mm. One example of a suitable reflector 46 may include a carbon graphite layer having a reflective aluminum backing.

A planarizing layer 48 may be deposited over another surface of the scintillator 42 opposite the reflector 46. In some embodiments, the planarizing layer 48 may cover non-uniformities or roughness in the scintillator 42. A suitable planarizing layer 48 may cover defects (e.g., non-uniformities or roughness) such that no defects have a peak (i.e., height beyond the surface of the planarizing layer 48) that is higher than ⅔ the thickness of the planarizing layer 48. For example, a typical planarizing layer 48 may be less than approximately 10 μm, and the height of defects covered by the planarizing layer 48 may be less than approximately 20/3 μm. In some embodiments, the planarizing layer 48 may be substantially transparent and may not significantly affect the resolution or the transmission of light between the scintillator 42 and the photodetector 35 disposed over the planarizing layer 48. The planarizing layer 48 may include materials relatively low in density (e.g., polyimide) which will not significantly affect the intensity of radiation 16 passing through the planarizing layer 48 to the scintillator 42. Further, in some embodiments, the planarizing layer 48 may not be necessary, and the photodetector 35 may be disposed directly over the scintillator 42.

To form the photodetector 35 over the planarizing layer 48 or directly over the scintillator 42, the anode 36 may first be deposited using an un-patterned deposition technique (e.g., spin coat, spray coat, etc.). The anode 36 may be a doped thin metal oxide film, such as $SnO_2$, $ZnO_2$, indium tin oxide, or it may be a thin film including metals such as Ag, Au, or Al. In some embodiments, the anode 36 may be any suitable transparent conductive film having approximately 90% or higher transmission of light and approximately 100 Ω per square or greater conductivity.

An active organic layer 38 may be deposited over the anode 36 using, for example, solution processing, physical vapor deposition, spin coating, or liquid coating techniques. The active organic layer 38 may include one or more organic materials that produce charged carriers between two electrodes (i.e., the anode 36 and cathode 40) following the absorption of light (i.e., photons released by the scintillator 42). Typically, charge separation is achieved by juxtaposing two materials such that the most stable state of the electron (negative charge carrier, electron acceptor) is on one material, and the hole (positive charge carrier, electron donor) is on the other. One example of such a material pair is 3,4,9,10-perylene tetracarboxylic bisbenzimidazole (PTCBI, an electron acceptor), and copper phthalocyanine (CuPc, an electron donor). Another possible material pair includes poly(2-methoxy-5-(3',7' dimethyloctyloxy) 1,4, phenylene-vinylene, (MDMO-PPV) and (6,6) phenyl-C61-butyric acid methyl ester (PCBM). In addition, hybrid structures consisting of both organic components (such as poly-phenylene-vinylene derivatives) and inorganic nanocrystals of materials such as CdSe, or ZnTe may also be used. Such nano-crystalline materials may vary in size and shape, from approximately 2 nm spheres to high aspect ratio rods of order of microns in size, or may even possess multiple high aspect rods connected to a single core. The electron donor and acceptor materials may be deposited in either discrete layered structures or blended together.

The active organic layer 38 may include sub-layers such as electron or hole blocking layers, electron or hole transport layers, etc., which absorb the photons and transport the electric charge through the active organic layer 38. Each of the sub-layers can vary from a few nm to microns in thickness. Typical thicknesses of the organic layers are on the order of 10 nm-100 nm. Multilayer solution processed devices may be formed by the successive application of materials using solvents that do not dissolve underlying layers. For example, poly(3,4-ethylenedioxythiophene):poly(styrenesulfonate) (PDOT:PSS) does not dissolve in many organic solvents and may be a suitable first layer for a solution processed device, followed by a blend of (MDMO-PPV and PCBM) deposited from an organic solvent such as chlorobenzene. Multilayer organic structures may also be formed by physical vapor deposition of successive thin organic films, which may consist of one or more component molecules. As in the case of the amorphous silicon based photodiode, the overall thickness of the organic layers may be adjusted to obtain a desirable fraction of charge integrating signal.

The cathode 40 may be formed over the active organic layer 38. The cathode 40 may be a thin metal layer which is opaque and reflective, such that any unabsorbed light from the scintillator 42 may be reflected back into the active organic layer 38, thereby improving the quantum efficiency of the photodetector 35. Materials such as Ca, LiF, CsF, ITO, FTO, or any transparent and conductive semiconductor, etc. may be added to the cathode 40 in some embodiments to increase the series contact resistance of the cathode 40 to the photodetector 35.

In some embodiments, the cathode may be prepared using physical vapor deposition or via sputter coating techniques, and a shadow mask may be employed during deposition or sputtering to define an array of contact pads 35. The contact pads 41 may be rectangular in some embodiments, though in other embodiments, the contact pads 41 may be any shape suitable for providing an electrical contact between the cathode 40 and a TFT array 34. The contact pads 41 and may be spaced substantially equally over the plane of the cathode 40 to align with pixels of the photodetector module 12. In some embodiments, the contact pads 41 of the cathode 40 may be approximately 10-15 μm wide and may have a pitch (i.e., the spacing between the contact pads 41 which corresponds to a pixel of the photodetector module 12) that is larger than the size of the contact pads 41. For example, if the contact pads 41 are 10-15 μm, the pitch between the contact pads 41 may be approximately 20 μm or larger. In some embodiments, the pixel pitch may be approximately 200 μm.

Once the photodetector 35 is disposed over the scintillator 42, the photodetector 35 may be coupled with the TFT array 34. FIG. 4 is a side view of another intermediate form in the fabrication of the photodetector module 12, before the photodetector 35 is coupled to the TFT array 34. In some embodiments, the TFT array 34 may include an array of TFTs in a glass or low density plastic substrate having a thickness from one to a few millimeters in thickness. Furthermore, in some embodiments, the TFT array 34 may be patterned to have contacts 54 which may align with the contact pads 41 of the photodetector 35 to obtain a better electrical connection between the TFT array 34 and the photodetector 35. The TFT array 34 may be thinner in some embodiments to decrease the absorption of radiation 14 impinging the photodetector module 12, and in some embodiments, the TFT array 34 may be flexible to be compatible with other flexible layers of the photodetector module 12. The arrangement of TFTs in the TFT array 34 may correspond to the contact pads 41 and/or the pixels of the photodetector 35. As used herein, a pixel of the photodetector module 12 may include a contact pad 41 of the cathode 40 and a corresponding pixel pitch (i.e., the space in between adjacent contact pads 41) including portions of the anode 36, the cathode 40, and the active organic layer 38 in between. The pixel may also include a TFT of the TFT array 34 which is aligned with the contact pad 41.

An adhesive layer 50 may be disposed over the TFT array 34 to physically bond the TFT array 34 to the photodetector 35. In some embodiments, the adhesive layer 50 may instead be disposed over the cathode 40 to physically bond the photodetector 35 to the TFT array 34. The adhesive layer 50 may include any suitable adhesive and conductive material. For example, the adhesive layer 50 may include an anisotropic conductive paste or film (ACP or ACF), an adhesive tape, an acrylic binder, or a heat activated glue. The adhesive layer 50 may laminate the TFT array 34 and the photodetector 35 together, and in some embodiments, heat and/or pressure may be applied against the TFT array 34 and/or the photodetector 35 to laminate the TFT array 34 and the photodetector 35 together.

Furthermore, the adhesive layer 50 may be conductive in a z-direction (e.g., perpendicular to the plane of the TFT array 34) and not significantly conductive in x- or y-directions (e.g., in-plane with the TFT array 34). As the adhesive layer 50 is conductive in only the z-direction, the electrical charges formed in pixels of the photodetector 35 may be transferred via the contact pads 41 to the corresponding TFTs in the TFT array 34 without shorting the pixels of the photodetector module 12. The wires 52 in the adhesive layer 50 represents a conductive path (e.g., a source line or drain line of the TFTs, etc.) which may be suitable for transmitting electric charge between the photodetector 35 and the TFT array 34.

A side view of a complete photodetector module 12 is illustrated in FIG. 5. During imaging, the radiation 16 or 17 from an imaging source impinges the photodetector module 12 after being attenuated by an intervening subject or object undergoing imaging. It should be noted that in different embodiments, radiation may be impinged from either direction perpendicular to the plane of the photodetetor module 12. For example, radiation 16 may be impinged in a direction through the TFT array 34, or in some embodiments, radiation 17 may be impinged in a direction through the reflector 46. The radiation 16 or 17 may pass through layers of the photodetector module 12 (including the TFT array 34, the adhesive layer 50, the cathode 40, the active organic layer 38, the anode, and the planarizing layer 48 to the scintillator 42. The wavelength of the radiation 16 or 17 may be short enough to pass through these layers without significant loss in intensity.

The scintillator 42 may absorb the radiation 16 or 17 and release the absorbed energy in the form of optical photons or other lower energy photons. As indicated by the arrow 56, the optical photons emitted by the scintillator 42 may pass through the planarizing layer 48 and the anode 36, each of which are generally transparent (e.g., greater than 90% transmission of optical photons) to be absorbed at the active organic layer 38 of the photodetector 35. As indicated by the arrow 58, optical photons which are not directly emitted towards the active organic layer 38 may be reflected by the reflector 46 to increase the percentage of photons which pass through the scintillator 42 and towards the photodetector 35. Furthermore, optical photons which pass through the active organic layer 38 may be reflected by reflective areas of the cathode 40, as indicated by arrow 60, thereby further increasing the percentage of optical photons emitted by the scintillator to be absorbed by the active organic layer 38 and improving the quantum efficiency of the photodetector module 12.

Once the optical photons are absorbed by the organic active layer 38, the organic materials may produce charged carriers, and charge separation may occur between the positive electrode (e.g., the cathode 40) and the negative electrode (e.g., the anode 36). This electric charge generated in the photodetector 35 layers may be transferred from each of the pixels of the photodetector 35 via the respective contact pads 41 of the cathode 40. The charge may pass through the adhesive layer 50 (which may be conductive in the z-direction) and to the respective TFTs of the TFT array 34. The electric charges may be digitized by the TFT array 34 and transmitted to control and processing circuitry (e.g., through readout circuitry 18 and to the control and processing circuitry 14 in FIG. 1) for further processing and reconstruction of the scanned image.

Figure 6:
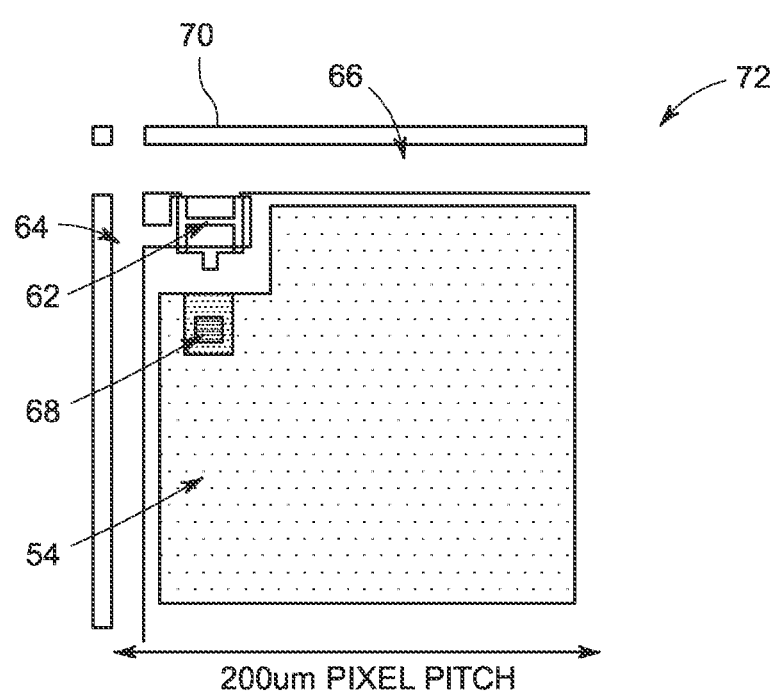
FIG. 6 depicts a top view of a portion of a pixel element array of the photodetector module illustrated in FIG. 5, in accordance with one embodiment of the present disclosure.

FIG. 6 is a top view illustration of a portion 72 of the TFT array 34 corresponding to one pixel of the photodetector module 12. As discussed, the pixel portion 72 of the photodetector module 12 may include a contact pad 41 of the cathode 40 and portions of the anode 36, the cathode 40, and the active organic layer 38 in between, and a TFT of the TFT array 34 which is aligned with the contact pad 41. From the top view of the pixel portion 72 of the TFT array 34 illustrated in FIG. 6, the contact pad 54 may be visible, and the components of the TFT 62, such as the gate, the source lines 64 and the drain lines 66 may be buried under a passivation layer 70 which protects the TFT 62 from environmental components and/or reactions with the photodetector 35. The passivation layer 70 may be formed through the passivation via 68. The contact pad 54 may be fabricated to any size, and in some embodiments, the contact pad 54 may be sized to approximately one pixel pitch to increase the contact area through which charge from a corresponding contact pad 41 of the photodetector 35 may be transmitted. In some embodiments, the large combined area of the contact pads 54 relative to the area of the TFT array 34 may decrease alignment errors and increase alignment tolerance, thereby improving the connections between each layer and component of a pixel in the photodetector module 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A radiation detector module, comprising:
a thin film transistor (TFT) array;
a photodetector disposed beneath the TFT array, the photodetector comprising:
  a cathode disposed beneath the TFT array;
  an active organic element disposed beneath the cathode; and
  an anode disposed beneath the active organic element, wherein the cathode is reflective on a side facing the active organic element, and wherein the reflective side of the cathode is configured to reflect optical photons generated by the scintillator back to the active organic element;
an adhesive layer, wherein the TFT array is physically bonded to the photodetector by the adhesive layer; and a scintillator substrate disposed beneath the photodetector, wherein the scintillator substrate absorbs radiation passing through the TFT array and the photodetector and emits optical photons in response to the absorbed radiation, and wherein the photodetector absorbs optical photons emitted by the scintillator and generates charge in response to the absorbed optical photons.

2. The radiation detector module of claim 1, wherein the TFT array comprises an array of transistors, each configured to receive a charge generated by the photodetector.

3. The radiation detector module of claim 2, wherein each transistor in the array of transistors corresponds to a pixel of the photodetector.

4. The radiation detector module of claim 2, wherein the array of transistors comprises an array of thin film transistors (TFTs).

5. The radiation detector module of claim 1, wherein the adhesive layer is one or more of an anisotropic conductive paste, an anisotropic conductive film, and a conductive tape.

6. The radiation detector module of claim 1, wherein the adhesive layer is substantially conductive in a z-direction perpendicular to a plane of the TFT array and not significantly conductive in a x-direction or in a y-direction.

7. The radiation detector module of claim 1, wherein the cathode comprises an array of cathode contact pads, and wherein each cathode contact pad corresponds to one pixel of the radiation detector module.

8. The radiation detector module of claim 1, wherein the anode is configured to transmit 90% or more of the optical photons which impinge the anode from the scintillator.

9. The radiation detector module of claim 1, wherein the scintillator comprises one or more of sinter or sputter deposited ceramic or sinter or sputter deposited glass.

10. The radiation detector module of claim 1, wherein the scintillator comprises particle-in-binder scintillators.

11. The radiation detector module of claim 1, comprising a planarizing layer disposed between the scintillator and the photodetector, wherein the planarizing layer is substantially transparent.

12. The radiation detector module of claim 1, comprising a reflector configured to reflect the optical photons emitted by the scintillator towards the photodetector disposed above the scintillator.

* * * * *